(12) United States Patent
Crinon et al.

(10) Patent No.: US 7,565,677 B1
(45) Date of Patent: Jul. 21, 2009

(54) METHOD AND APPARATUS FOR MANAGING A DATA CAROUSEL

(75) Inventors: Regis J. Crinon, Camas, WA (US); Martin Taillefer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 10/663,516

(22) Filed: Sep. 15, 2003

Related U.S. Application Data

(63) Continuation-in-part of application No. 10/419,616, filed on Apr. 21, 2003.

(51) Int. Cl.
*H04N 7/173* (2006.01)

(52) U.S. Cl. .................. 725/114; 370/487; 370/493; 370/519; 370/535; 370/537; 725/118

(58) Field of Classification Search .............. 725/37, 725/109, 136, 114; 709/219; 370/412, 537
See application file for complete search history.

(56) References Cited

U.S. PATENT DOCUMENTS

| | | | |
|---|---|---|---|
| 5,805,825 A * | 9/1998 | Danneels et al. ............ 709/243 |
| 5,857,190 A | 1/1999 | Brown |
| 5,872,588 A | 2/1999 | Aras et al. |
| 5,978,855 A * | 11/1999 | Metz et al. .................. 709/249 |
| 6,047,317 A * | 4/2000 | Bisdikian et al. ............ 725/142 |
| 6,177,930 B1 * | 1/2001 | Chernock et al. ........... 715/716 |
| 6,188,703 B1 | 2/2001 | Dobson et al. |
| 6,240,094 B1 | 5/2001 | Schneider |
| 6,317,885 B1 * | 11/2001 | Fries ......................... 725/109 |
| 6,507,586 B1 | 1/2003 | Satran et al. |
| 6,782,006 B1 * | 8/2004 | Tanaka et al. ............... 370/468 |
| 6,895,595 B2 * | 5/2005 | Goodman et al. ........... 725/136 |
| 7,013,479 B2 | 3/2006 | Mori |
| 7,042,843 B2 | 5/2006 | Ni |
| 2002/0054071 A1 * | 5/2002 | Yamaguchi et al. ......... 345/723 |
| 2002/0099818 A1 * | 7/2002 | Russell et al. ............... 709/224 |
| 2002/0122387 A1 | 9/2002 | Ni |
| 2003/0002515 A1 * | 1/2003 | Crinon et al. ............... 370/412 |
| 2003/0074518 A1 | 4/2003 | Vorbach et al. |
| 2003/0115612 A1 * | 6/2003 | Mao et al. .................. 725/136 |
| 2003/0191815 A1 * | 10/2003 | Skaringer et al. ........... 709/219 |
| 2004/0010524 A1 | 1/2004 | Wallace et al. |
| 2004/0073941 A1 | 4/2004 | Ludvig et al. |

(Continued)

FOREIGN PATENT DOCUMENTS

EP  1 022 908 A1  7/2000

(Continued)

OTHER PUBLICATIONS

European Search Report in European Patent Application No. 04006886.8, completed Jul. 20, 2004, 5 pages.

(Continued)

*Primary Examiner*—Andrew Y Koenig
*Assistant Examiner*—Junior O Mendoza
(74) *Attorney, Agent, or Firm*—Lee & Hayes, PLLC

(57) ABSTRACT

A data carousel contains multiple data files having a particular arrangement. These files are cyclically broadcast to a number of receivers of the data files. A procedure modifies the arrangement of data files based on information obtained from receivers of the data files.

19 Claims, 8 Drawing Sheets

U.S. PATENT DOCUMENTS

2004/0205826 A1* 10/2004 Barbier et al. ............. 725/112
2004/0226051 A1    11/2004 Carney et al.

FOREIGN PATENT DOCUMENTS

| EP | 1022908 A1   |   | 7/2000  |          |
|----|--------------|---|---------|----------|
| EP | 1 182 882 A2 |   | 2/2002  |          |
| EP | 1182882 A2   |   | 2/2002  |          |
| JP | 2001086088   |   | 3/2001  |          |
| JP | 2002135215   |   | 5/2002  |          |
| JP | 2002135215 A | * | 5/2002  |          |
| JP | 2002-135215  | * | 10/2005 | 370/412  |
| WO | 2004/028119  |   | 4/2004  |          |
| WO | WO2004028119 A2 | | 4/2004 |          |

OTHER PUBLICATIONS

Patent Abstracts of Japan, vol. 2000, No. 20, Publication No. 2001/086088, published Mar. 30, 2001, 1 page.

Patent Abstracts of Japan, vol. 2002, No. 09, Publication No. 2002/135215, published May 10, 2002, 1 page.

Buchholz et al., "A Simulation Study of Update Techniques for Cyclic Data Broadcast," Proceedings of the 4th ACM International Workshop on Modeling, Analysis and Simulation of Wireless and Mobile Systems, 2001, pp. 115-122.

Lee et al; "Cooperation System of DSM-CC Data Carousel and MPEG-4 System via Satellite"; IEEE 2002; Proceedings International Conference on Information Technology: Coding and Computing. pp. 421-424.

Balabanian et al.; "An Introduction to Digital Storage Media-Command and Control (DSM-CC)" 1996 Institute of Electrical and Electronics Engineers, IEEE Communications Magazine, Nov. 1996; 13 pages.

Nadamoto, Akiyo; Kondo, Hiroyuki; Tanaka, Katsumi; "WebCarousel: Automatic Presentation and Semantic Restructuring of Web Search Result for Mobile Environments"; DEXA 2001, LNCS 2113; Berlin Heidelberg; 2001; pp. 712-722.

Aksoy, et al., "Scheduling for Large-scale On-Demand Data broadcasting", IEEE, Mar. 29-Apr. 2, 1998, vol. 2, pp. 651-659.

Buchholz, et al., "A Simulation Study of Update Techniques for Cyclic Data Broadcast" ACM 2000 pp. 1-8 retrieved from the Internet: URL: http://www.rn.inf.tu-dresden.de/scripts_Isrn/veroeffent_print/MSWiM2001.pdf.

* cited by examiner

METHOD AND APPARATUS FOR MANAGING A DATA CAROUSEL

RELATED APPLICATIONS

This is a continuation-in-part of application Ser. No. 10/419,616, filed Apr. 21, 2003, entitled "Method and Apparatus for Managing a Data Carousel."

TECHNICAL FIELD

The present invention relates to methods and systems that handle various data files in a data carousel.

BACKGROUND

Television broadcast systems use various methods and systems to distribute television content. Television signals can be distributed via cable, via satellite, or via over-the-air delivery. Interactive television systems permit two-way communication between the television service provider and the television viewer. Servers or similar systems at the head end distribute content to multiple set top boxes (or other devices) used by individuals. Interactive television systems allow individuals to communicate with the head end equipment. For example, individuals may request specific content, such as a movie or data listing. Additionally, individuals may respond to questions or provide other information to the equipment at the head end.

In some television systems, a data carousel is used to distribute data in a repetitive manner. An example data carousel generator uses data files organized in a file hierarchy of a storage mechanism to produce data modules encapsulated and packetized in MPEG-2 Transport Stream packets that can be transmitted (or played) in a cyclical manner. Typically, data files in a data carousel are multiplexed with other video, audio, or auxiliary data in a transport stream, such as an MPEG-2 (Moving Pictures Experts Group) video elementary stream. The data carousel protocol (or the related object carousel protocol) is defined in Part 6 of the MPEG-2 (Digital Storage Media Command and Control—DSM-CC) Standard, also referred as Standard ISO/IEC 13818-6. The data files may be transmitted, for example, using one or more digital television channels (also referred to as Virtual Channel television channels).

The quantity and arrangement of data files in the data carousel determines the frequency with which particular data files are transmitted and the delay between successive transmissions of the same data file. In systems that use a data carousel, it is desirable to optimize the latency between a user request for a data file and the user receiving the requested data file from the data carousel. In a static system in which the data files in the carousel don't change (or change infrequently and independently of user requests), managing this latency is relatively simple. However, in a dynamic environment in which new data files are being added to the carousel and existing data files are being removed from the carousel, managing the latency in the system is more difficult.

Accordingly, there is a need for an improved system and method to manage the operation of a dynamic data carousel.

SUMMARY

The systems and methods described herein manage various operations of a data carousel, including the insertion of files into the data carousel and the removal of files from the carousel. In one embodiment, the systems and methods manage a worst case latency between successive transmissions of a data file in a data carousel. This worst case latency is compared to a threshold latency value. If the worst case latency exceeds the threshold latency value, the composition of the data carousel is modified. In another embodiment, the systems and methods modify the data files of a data carousel based on various information obtained from receivers of the data files.

BRIEF DESCRIPTION OF THE DRAWINGS

Similar reference numbers are used throughout the figures to reference like components and/or features.

DETAILED DESCRIPTION

The systems and methods described herein manage data files contained in a data carousel. In particular, these systems and methods are able to insert new data files into the data carousel, delete existing data files from the data carousel and change the arrangement of data files in the data carousel. By monitoring worst case latencies between successive transmissions of data files in the data carousel, a particular quality of service level is maintained.

Figure 1:
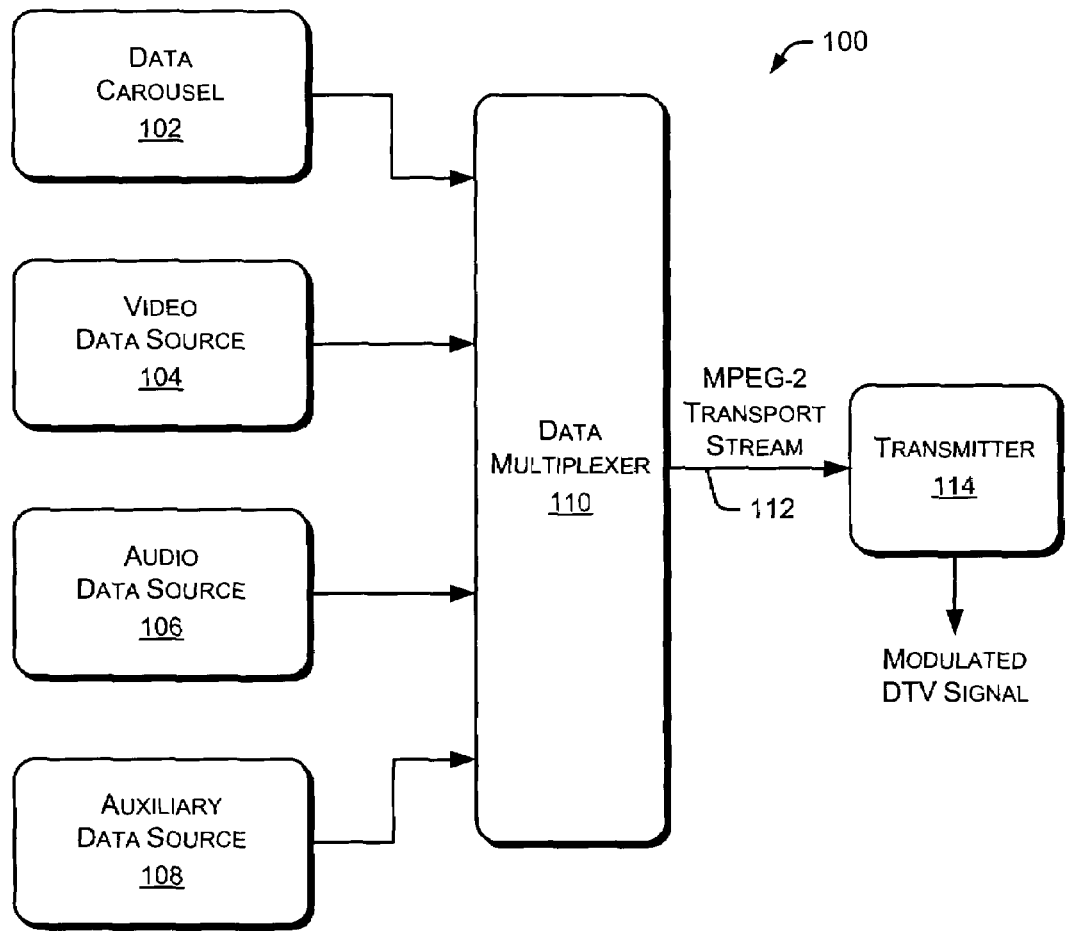
FIG. 1 is a block diagram illustrating an exemplary system that multiplexes data from various data sources to generate a data stream, such as an MPEG-2 transport stream.

FIG. 1 is a block diagram illustrating an exemplary system 100 that multiplexes data from various data sources to generate a data stream, such as an MPEG-2 transport stream. The environment of FIG. 1 may be referred to as the "head end" of a broadcast system. A data carousel 102, a video data source 104, an audio data source 106 and an auxiliary data source 108 are coupled to a data multiplexer 110. In alternate embodiments, data multiplexer 110 may be coupled to any number of data sources of any type. Data carousel 102 stores multiple data files and provides those data files to data multiplexer 110 in a repetitive manner. Additional details regarding data carousel 102 are discussed herein.

Video data source 104 may be any type of device capable of generating, reproducing, rendering, or otherwise providing MPEG-2 Transport Stream packets of video data to data multiplexer 110. Video data includes, for example, television programs, movies, pictures, and the like. Audio data source 106 can be any type of device capable of playing, recreating, or otherwise providing MPEG-2 Transport Stream packets of audio data to data multiplexer 110. In one embodiment, the audio data from audio data source 106 is associated with the video data from video data source 104. For example, the audio data may represent an audio track associated with a video program. In such case, the audio elementary stream(s) and the video elementary stream share the same reference clock so that the video and audio services are properly synchronized. Other examples of audio data include movie soundtracks, music, narratives, etc. Auxiliary data source 108 provides various MPEG-2 Transport Stream packets of data to data multiplexer 110, such as MPEG-2 System Information tables like the Program Association Table and the Program Map Table. Auxiliary data includes, for example, interactive television data, electronic program guide information, games, and the like. Auxiliary data may or may not be synchronized to the video and/or audio services.

Data multiplexer 110 receives MPEG-2 Transport Stream packets from the various sources shown in FIG. 1 and multiplexes the received data into a single MPEG-2 Transport Stream 112. Transport Stream 112 is provided to a transmitter 114, which converts the bits to an analog signal which is then modulated and transmitted to any number of receiving devices (not shown). The MPEG-2 data stream can be transmitted over-the-air, via cable, via satellite, via one or more data communication networks, or any other transmission medium. Although the example of FIG. 1 discusses MPEG-2 as an example encoding technique, alternate embodiments may utilize any data encoding technique. Further, various embodiments may communicate data using any protocol and any type of communication medium.

FIG. 1 represents one possible environment in which a data carousel is used to provide data files. Various other arrangements of systems and components may utilize data files from a data carousel.

Exemplary systems and procedures discussed herein relate to television systems, such as interactive television systems. However, the systems and procedures described herein can be used in any environment where the distribution of files from a data carousel is desired.

As used herein, any reference to the terminology "data carousel" may be substituted for "object carousel". The Object Carousel is a protocol similar to the data carousel, except that it defines additional semantics on the construct of the data modules of a data carousel to support a more complex hierarchical structure among objects that are downloaded. Whether the MPEG-2 Data Carousel or the MPEG-2 Object Carousel protocols or variations/enhancements thereof is used, the terminology "file" or "data file" refers to the contents of a single data module which is the unit of transmission in these protocols. In this context, it should be understood that a "file" or a "data file" can be the aggregation of multiple system or user files residing within the same data module. This is particularly true for the Object Carousel protocol where typically (but not necessarily), multiple BIOP (Broadcast Inter-ORB Protocol) objects are conveying in a single data module.

Figure 2:
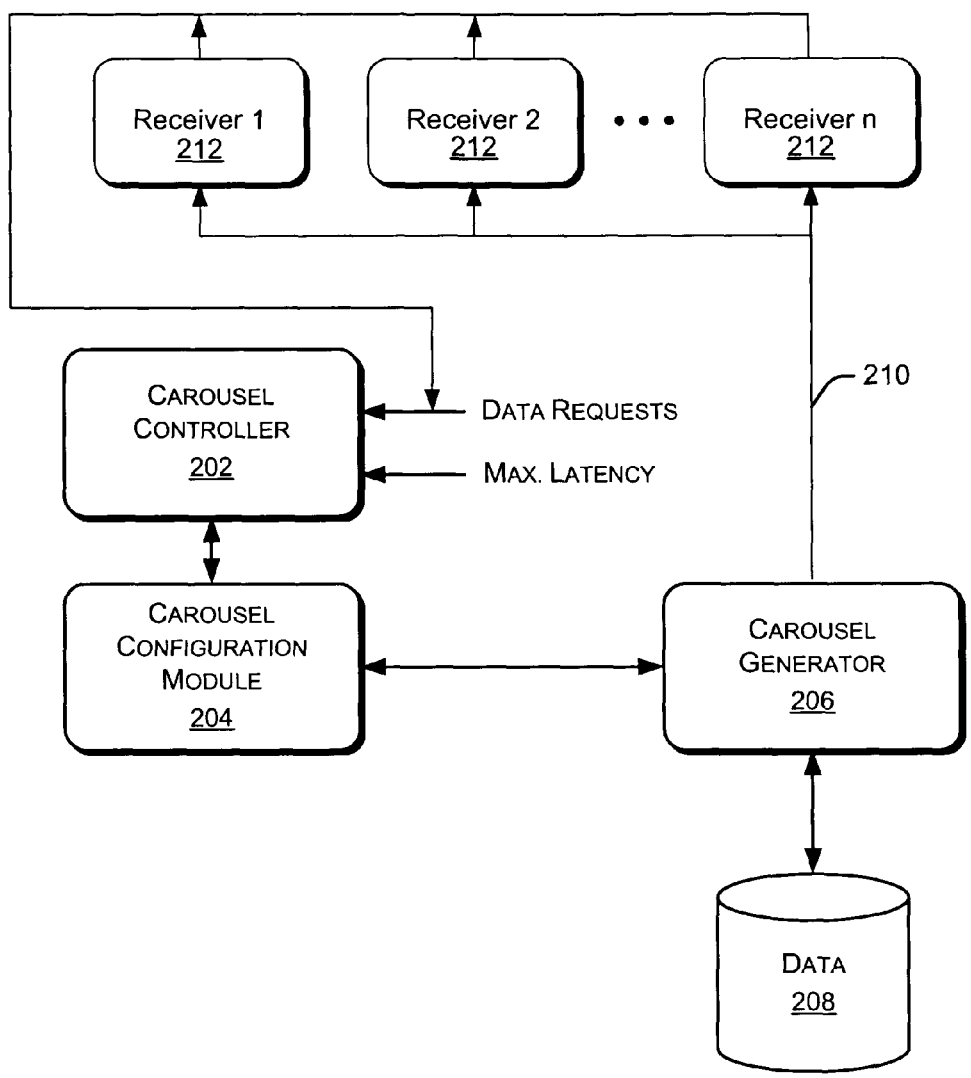
FIG. 2 is a block diagram illustrating an example data carousel.

FIG. 2 is a block diagram illustrating an example implementation of the data carousel 200. A carousel controller 202 receives operational information such as data requests and maximum latency information. Data requests may include, for example, requests for the number of MPEG-2 Program Elements used to convey the data carousel, the bit rate for the data carousel or the parameters of the MPEG-2T-STD (Transport System Target Decoder) buffer model governing the delivery of the data, and requests and other information from receivers 212 of the data files. Maximum latency information is a preferred maximum amount of time permitted between receiving a request for a particular file and providing the requested file from the data carousel. This maximum latency information defines a particular quality of service provided by the data carousel system. Additional details regarding the maximum latency information are provided below. Additional details regarding the requests and other information from receivers 212 of the data files are also provided below.

Carousel controller 202 is also responsible for managing the overall operation of the data carousel. For example, carousel controller 202 is responsible for determining which data files are inserted into the data carousel and which data files are deleted from the data carousel. Carousel controller 202 also determines the types of data that are contained in the data carousel.

A carousel configuration module 204 is coupled to carousel controller 202 and contains various configuration data used by the components shown in FIG. 2. Example configuration data includes the size of the data files stored in the carousel, the frequency with which various data files are repeated, the manner in which existing data files are deleted from the data carousel and the manner in which new data files are inserted into the data carousel. The carousel configuration module 204 is also used to provide caching instructions for particular files in the carousel, instructions for organizing the files and directories across all data modules, instructions for specifying the size of the MPEG-2 sections used to encapsulate the data carousel protocol, timeout information, and instructions for how many times each file must be repeated in a fundamental period of the carousel.

Carousel configuration module 204 is coupled to a carousel generator 206, which generates the data files that are formatted as a sequence of MPEG-2 Transport Stream packets 210. Carousel generator 206 is coupled to a data storage device 208, which stores various data, such as video data, audio data, interactive television data, program guide information, game data, and the like. Carousel generator 206 is also coupled to the data file receivers 212. Carousel generator 206 retrieves data from data storage device 208 and generates MPEG-2 Transport Stream packets corresponding to one or more data files for delivery to the data file receivers 212.

As discussed herein, data carousel files are periodically removed from the data carousel, as determined by carousel controller 202. Additionally, new data files may be added to the existing data carousel files based on instructions from carousel controller 202.

Data carousel files are arranged in a cyclical manner, as discussed below. Multiple copies of a particular data file may be contained in the data carousel files. Multiple copies of a particular data file may also be referred to as multiple "instances" of the data file. Output data is generated by data carousel files based on the "active" data file in the carousel.

Different receivers may tune to the same television channel at different times. This situation is addressed by repeating the transmission of important data files, so that each receiver receives the important data files soon after tuning to a particular channel. Thus, use of a data carousel of the type described herein can provide faster access to important data.

Figure 3:
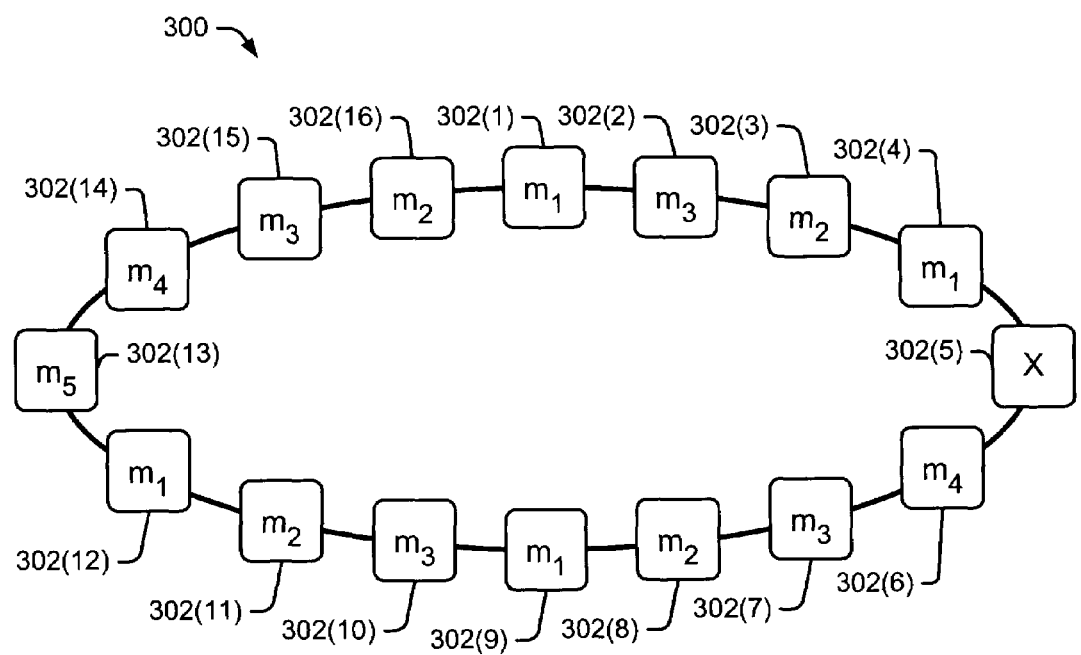
FIG. 3 is a block diagram showing an exemplary data carousel containing a sequence of bounded data modules.

FIG. 3 is a block diagram showing an exemplary data carousel 300 containing a sequence of bounded data modules 302. Data modules 302 represent a basic component of data carousel 300. Each data module 302 is capable of storing a data file, several BIOP (Broadcast Inter-ORB Protocol) objects as defined in MPEG-2 DSM-CC, or other information. Particular embodiments discussed herein store data files (e.g., files identified as $m_1$, $m_2$, $m_3$, $m_4$ and $m_5$) in data carousel 300. These data files may contain various types of data or information. For example, in accordance with one embodiment, the data files may store image data, such as web pages, and the like. In another embodiment, the data files store executable files. It should be understood, however, that data files may store various other types of data or information. In general, data files may contain any type of data used for any purpose.

Data carousel 300 contains sixteen data modules 302, labeled 302(1)-302(16). Alternate embodiments of data carousel 300 may contain any number of data modules 302. A specific embodiment of data carousel 300 contains several hundred data modules 302. The sequence of data files shown in carousel 300 are repeated in a cyclical manner.

As discussed herein, the positioning of data in data modules 302 affects the manner in which data is received by the data file receivers 212. Receivers (and receiver users or receiver applications) typically have expectations as to how often a particular type of data should be received. For example, a data file receiver may expect all data to be displayed within five seconds of tuning to a particular channel.

Various techniques are available for populating data carousel 300 and positioning data in the data modules 302. One technique puts the most popular data (e.g., the most requested data) in data carousel 300 and inserts infrequently requested data into data carousel 300 after receiving a request for the data. The data stored in data carousel 300 may change over time based, for example and without limitation, on the time of day, changes in popularity of information or programs, feedback received from data file receivers 212, etc.

As shown in data carousel 300, one or more copies of the same data file may be stored in multiple data modules 302. For example, data file $m_1$ is represented four times in data carousel 300. Similarly, data file $m_2$ is represented four times, data file $m_3$ is represented four times, data file $m_4$ is represented two times and data file $m_5$ is represented one time in data carousel 300. One data module 302(5) in carousel 300 is empty, as indicated by an "X", meaning it is not present in the Transport Stream.

One issue that arises in a data carousel environment is how to position (or distribute) multiple data files in the data carousel such that a receiver begins acquiring a particular data file within the next T seconds. Additionally, when populating data files in a data carousel or modifying the current set of data files in the data carousel, the system generally determines which data files should be in the data carousel and which files should wait to be inserted into the data carousel until they are requested by a receiver. For example, receivers may be coupled to a data carousel through a "back channel", which is a separate communication link from the in-band paths used to transmit the data stream to the receiver. Example back channels include network connections, such as a broadband connection, out-of-band transmission paths, or a POTS (Plain Old Telephone Service) communication link.

Various calculations, formulas and discussions herein utilize certain variables and other information discussed below. With reference to FIG. 3, a variable K represents the rate in bits/second at which data is delivered from data carousel 300. In one embodiment, the data files are substantially evenly distributed in data carousel 300. The worst case latency (i.e., the maximum latency) for acquiring a data file from data carousel 300 should not exceed T seconds.

In one embodiment, the value of T is calculated by adding the time it takes for a data file receiver request to reach the head end (e.g., via a back channel), the time it takes the head end to insert the file into the data carousel and the time it takes for the data file receiver to acquire the data. Thus, the value of T is set such that the data carousel provides data to data file receiver faster than if the data file receiver requested the specific data.

As shown in FIG. 3, data carousel 300 contains sixteen data modules 302, each capable of storing a data file. The total number of modules in carousel 300 is represented by a variable M. In carousel 300, each data file $m_i$ is repeated $r_i$ times. For example, data file $m_1$ is repeated four times and data file $m_4$ is repeated two times. The value of $r_i$ is a measure of the importance of a data file. The greater the value of $r_i$, the greater its importance and the greater its frequency in data carousel 300. The amount of data stored in each module $m_i$ is $s_i$ bits. The total number of bits in one period of carousel 300 is represented by a variable S. The value of S is calculated using the following formula.

$$S = \sum_{i=1}^{i=M} r_i s_i$$

The period of carousel 300 is the time needed to send S bits at the bit rate of K bits/second. The period of carousel 300 is represented by a variable P. The value of P is calculated using the following formula.

$$P = S/K \text{ seconds}$$

For a particular data file $m_j$ in a data carousel containing M data files, the largest amount of time necessary to wait to receive the next occurrence of data file $m_j$ in the data carousel is represented by $Lmax_{j,M}$. $Lmax_{j,M}$ represents a worst case scenario and represents the longest time (in seconds) that a receiver needs to wait before receiving data file $m_j$ in a data carousel having M data files. This value is calculated using the following formula.

$$Lmax_{j,M} = \frac{\sum_{i=1,i \neq j}^{i=M} d_{i,j} s_i}{K} \text{ seconds}$$

where $$d_{i,j} = \left\lceil \frac{r_i}{r_j} \right\rceil$$

When calculating $d_{i,j}$, $r_i$ represents the number of times data file $m_i$ is repeated in the data carousel and $r_j$ represent the number of times data file $m_j$ is repeated in the same data carousel. The variable $d_{i,j}$ determines a ratio of frequencies of two data files in a data carousel (i.e., the frequency of one data file relative to the frequency of another data file). The value of $d_{i,j}$ is rounded up to the next integer such that $d_{i,j}$ is equal to or greater than one. The rounding operation takes into account the fact that the ratios may not always be integer values and distribution of the data files in the data carousel may not always be exactly uniform. Thus, the relative positioning of the data files $m_i$ relative to the data files $m_j$ in the data carousel may cause some intervals separating two consecutive data files $m_i$ to include an additional data file $m_j$. Rounding up ensures that latency calculations represent the worst case latency scenario.

The formula for $Lmax_{j,M}$ shown above calculates the longest wait time for data file $m_j$ from a data carousel. The summation portion of the formula sums over all data files i. The value of $d_{i,j}$ identifies the number of data files that may be encountered before the next occurrence of data file $m_j$. The portion of the formula that contains $s_i/K$ identifies the time needed to transmit data file $m_j$.

Referring again to FIG. 3, the latency between successive transmissions of data file $m_1$ varies as follows. Following a clockwise rotation (which we will assume herein as representing the order in which the modules are transmitted), the latency between module 302(1) and 302(4) is three (i.e., three positions in the data carousel). Continuing in a clockwise rotation, the latency between module 302(4) and 302(9) is four in the case where empty module 302(5) is skipped. The latency between module 302(9) and 302(12) is three. Finally, the latency between module 302(12) and 302(1) is five. Thus, the worst latency between successive transmissions of data file $m_1$ from the data carousel is five positions. The actual latency time is the time necessary to transmit the data files contained in those five intermediate positions.

If a data file requested by a user is not in the data carousel, the requested data file is added to the data carousel. For this example, the requested data file is added to the data carousel without removing any data files from the data carousel. The requested data file is referred to as $m_{M+1}$. The requested data file is repeated $r_{M+1}$ times in one period of the carousel and the size of module $m_{M+1}$ is $s_{M+1}$. Since an additional data file has been added to the data carousel without changing the delivery rate (K bits/second), the largest latency until a module $m_j$ is received by a receiver is determined using the following formula.

$$Lmax_{j,M+1} = \frac{\sum_{i=1,i \neq j}^{i=M+1} d_{i,j} s_i}{K} \text{ seconds}$$

Where $d_{M+1,j}$ is the ratio $r_{M+1}/r_j$ rounded up to the next integer. The value of $r_{M+1}$ can be selected such that $Lmax_{M+1,M+1}$ (the worst case latency to receive data file $m_{M+1}$ after it has been added to the data carousel) is less than or equal to T seconds. Thus, a data file repetition value $r_{M+1}$ is selected such that $$Lmax_{M+1,M+1} = \frac{\sum_{i=1}^{i=M} d_{i,M+1} s_i}{K} \leq T \text{ seconds}$$

Alternatively, other criteria can be used if the carousel already contains a large number of data files. If $j \neq M+1$, then the above equation can be rewritten as follows.

$$Lmax_{j,M+1} = Lmax_{j,M} + \frac{d_{M+1,j} s_{M+1}}{K}$$

The quantity $d_{m+1,j} s_{M+1}/K$ represents the additional latency to acquire data file $m_j$ from the data carousel after adding another data file to the data carousel and without removing any data files. This additional latency is generally acceptable as long as any $Lmax_{j,M+1}$ remains less than or equal to T (for $1 \leq j \leq M+1$). If one $Lmax_{j,M+1}$ becomes larger than T seconds ($j \neq M+1$), then the data file $m_j$ corresponding to that $Lmax_{j,M+1}$ is removed from the data carousel to avoid degrading the overall performance of the data carousel. The situation where $j=M$ and where the value of $Lmax_{j,M+1}$ is larger than T seconds means that the duplication factor $r_{M+1}$ for the new module was not selected high enough and must be increased to meet the criteria.

Figure 4A:
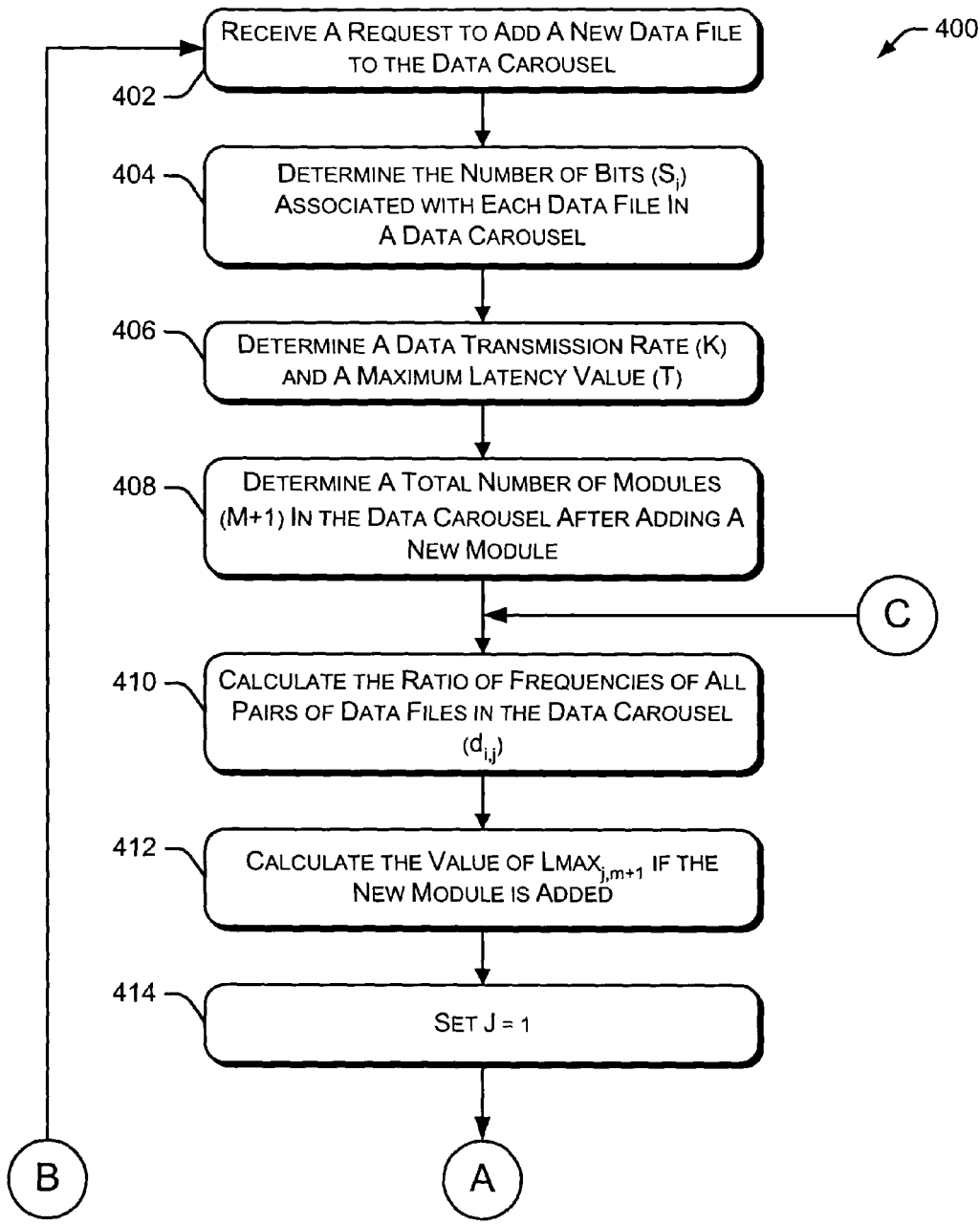
FIGS. 4A and 4B represent a flow diagram illustrating a procedure for adding data files to a data carousel and removing data files from a data carousel.
Figure 4B:
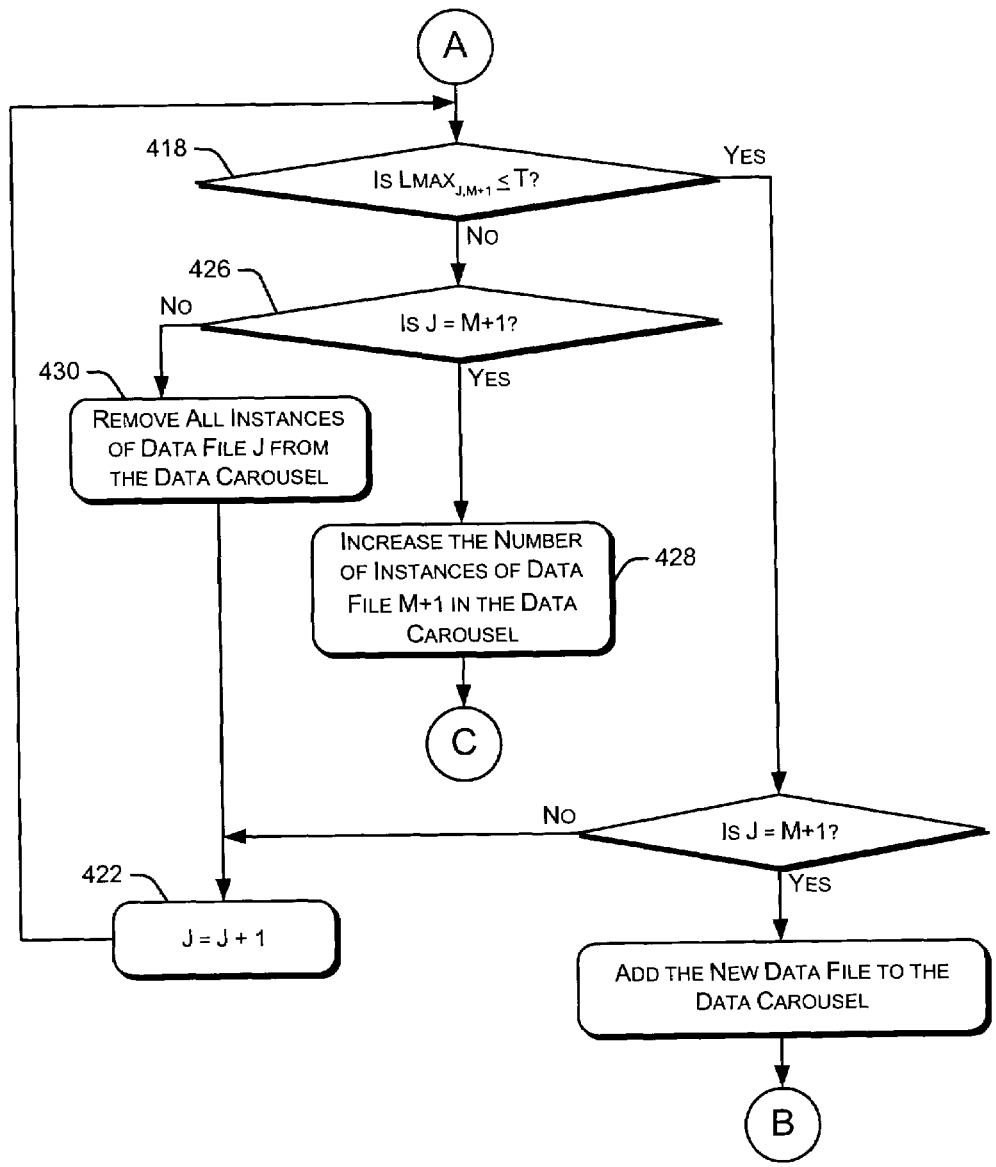

FIGS. 4A and 4B represent a flow diagram illustrating a procedure 400 for adding data files to a data carousel and removing data files from a data carousel. This procedure is implemented by the carousel controller 202 of FIG. 2. Initially, procedure 400 receives a request to add a new data file to the data carousel (block 402). This request may be from one or more of the data file receivers 212 or from an administrator of a broadcasting system that includes a data carousel. The procedure then determines the number of bits ($s_i$) associated with each data file in a data carousel (block 404). At block 406, the procedure then determines (e.g., reads) a data transmission rate (K) and a maximum latency value (T). Procedure 400 continues by determining (e.g., reading) a total number of modules (M+1) in the data carousel (block 408) and the number of occurrences of each module in the carousel period. The total number of modules (M+1) refers to the number of modules if a new module is added to the carousel. At block 410, the procedure calculates the ratio of frequencies of all pairs of data files in the data carousel ($d_{i,j}$). Next, the procedure calculates the anticipated value of $Lmax_{j,M+1}$ if the new module is added (block 412).

Procedure 400 then initializes a variable J to identify the first data file in the list (block 414). At block 418 (FIG. 4B), the procedure determines whether the latency for file J after the new module is added is still within the maximum tolerance T. If so, the procedure determines whether all data files have been considered (block 420). If additional data files remain to be considered, the procedure branches to block 422, which increments the value of J and returns to block 418. If all data files have been considered at block 420, the procedure adds the new data file to the data carousel (block 424). The procedure then returns to block 402 (FIG. 4A) to await the next request to add a new data file to the data carousel.

If, at block 418, the latency for file J after the new module added is not within the maximum value T, the procedure determines whether the data file that does not meet the criterion is the newly added file (block 426). If yes, the procedure increases the number of instances of data file M+1 in the data carousel (block 428). The procedure then returns to block 410 to recalculate the ratios since the number of instances of the new data file was increased by one.

If no (at block 426), the procedure removes all instances of data file J from the data carousel (block 430). In this situation, removing some of the instances of data file J is not helpful because the latency condition would still fail (too large of a latency between consecutive occurrences of the same data file). From block 430, the procedure increments the value of J and returns to block 418 to continue evaluating the remaining values of J.

An alternative to removing one or more data files as depicted in process 400 is to increase the delivery bit rate K so the overall carousel period is reduced. When removing a data file from the data carousel, the procedure first may try to remove a single instance or multiple instances of a data file (as long as the latency criterion is still satisfied) before it decides to remove all instances of the data file. If all instances of a particular data file are removed from the data carousel, the data file is no longer available from the data carousel.

The procedure illustrated in FIGS. 4A and 4B represents one example of a procedure for adding data files to a data carousel and removing data files from a data carousel. In alternate embodiments, various modifications are made to the procedure illustrated in FIGS. 4A and 4B. For example, as opposed to going back to block 418 after block 422, it may be preferable to go back to block 410 after decrementing the value of M by one. In this case, the latency values $Lmax_{j,M+1}$ are all recalculated to take into account that one data module has been removed from the carousel. In another alternative, after block 430, the remaining values for $Lmax_{j,M+1}$ are recalculated to account for one less data file in the data carousel. This recalculation is performed because the new latency values calculated with M modules may pass the criteria while the values calculated with M+1 modules does not pass the criteria. In other embodiments, the data delivery rate of the carousel is increased to reduce the time between subsequent transmissions of instances of the same data file. In these two alternative designs, additional operations similar to those illustrated in blocks 510, 512 and 514 of FIG. 5 (discussed below) may be required.

In one embodiment, a carousel controller (e.g., carousel controller 202 in FIG. 2) maintains the values of $Lmax_{j,M}$ in a table. For example, the table may contain M entries and M corresponding latency values. After adding another module to the data carousel, the carousel controller updates the latency values with the values $Lmax_{j,M+1}$ and also computes an additional value $Lmax_{M+1,M+1}$. These new latency values are then analyzed to determine whether any of the values exceed T. If so, the carousel controller removes the module $m_u$ (assuming that u is not equal to M+1) with the largest value $Lmax_{u,M+1}$ and adds module $m_{M+1}$ to the data carousel. If the latency for module M+1 exceeds T seconds, this means that the repetition factor for data file M+1 was not properly chosen in the first place and therefore must be increased. If none of the latency values exceed T, module $m_{M+1}$ is added to the carousel without removing any other modules. This procedure enforces a certain minimum level of quality of service to receivers that are receiving data from the data carousel.

In an alternate embodiment, to leverage the fact that there may be unnecessary instances of a data file, the system decreases the frequency of certain data files to make room for one or more new data files as long as the latency criterion is still verified. These files are typically the ones for which $Lmax_{u,M+1}$ is much smaller than the threshold T. Thus, rather than completely deleting all copies of a data file to make room for new data files, a portion of the copies of various data files are removed to provide space for the new data files.

In one embodiment, the data carousel is designed such that it can deliver any data file in less time than it takes to request the data file through a back channel or other communication link.

When determining whether to add a new data file to a data carousel, the data carousel monitors and aggregates various requests for data files from the data file receivers 212 and/or other sources. For example, the carousel controller maintains a record of the data file requests received over a pre-defined time window. Insertion of new data modules as well as removal of data modules is driven by the requests accumulated over that period of time. The relative frequency of a new data file is calculated from the relative number of requests for one data file versus others.

In another embodiment, $d_{i,j}$ is calculated to represent an "average" latency for module $m_j$ over one period of the data carousel. In this embodiment, $d_{i,j}$ is calculated as follows.

$$d_{i,j} = \frac{r_i}{r_j}$$

Using this averaging technique, the formula for Lmax can be expressed as follows.

$$Lmax_{j,M+1} = Lmax_{j,M} + \frac{r_{M+1}s_{M+1}}{r_j K}$$

According to the above formula, the frequency of repetition for a new module $m_{M+1}$ should be such that the following condition is true for all modules $m_j$.

$$r_{M+1} \leq \frac{T K r_j - \sum_{i=1, i \neq j}^{M} r_i s_i}{s_{M+1}}$$

Additionally, the time needed to acquire module $m_j$ could also be included in the formulas shown above to take into account the time it takes to download the data file of interest. In this case, latency accounts for complete availability of the data module in the receiver. The former case measures latency up to the instant where the data files start being acquired by the data file receiver 212, as discussed in the previous paragraphs.

Assuming that the repetition factor was properly selected for the new data file, and when a data file needs to be deleted from the data carousel (e.g., to allow a new data file to be added to the data carousel), the system must select an appropriate data file. In one embodiment, a data file generating the largest value for Lmax is deleted from the data carousel. In another embodiment, all instances of one or several data file(s) having the lowest priority is deleted from the carousel. Alternatively, the system may delete the data file having the fewest requests during a recent time period or the data file that has not been requested for the greatest period of time. Various other procedures can be used to select a data file to be deleted from the data carousel. In particular embodiments, carousel controller 202 determines which data file to delete from the data carousel.

Figure 5:
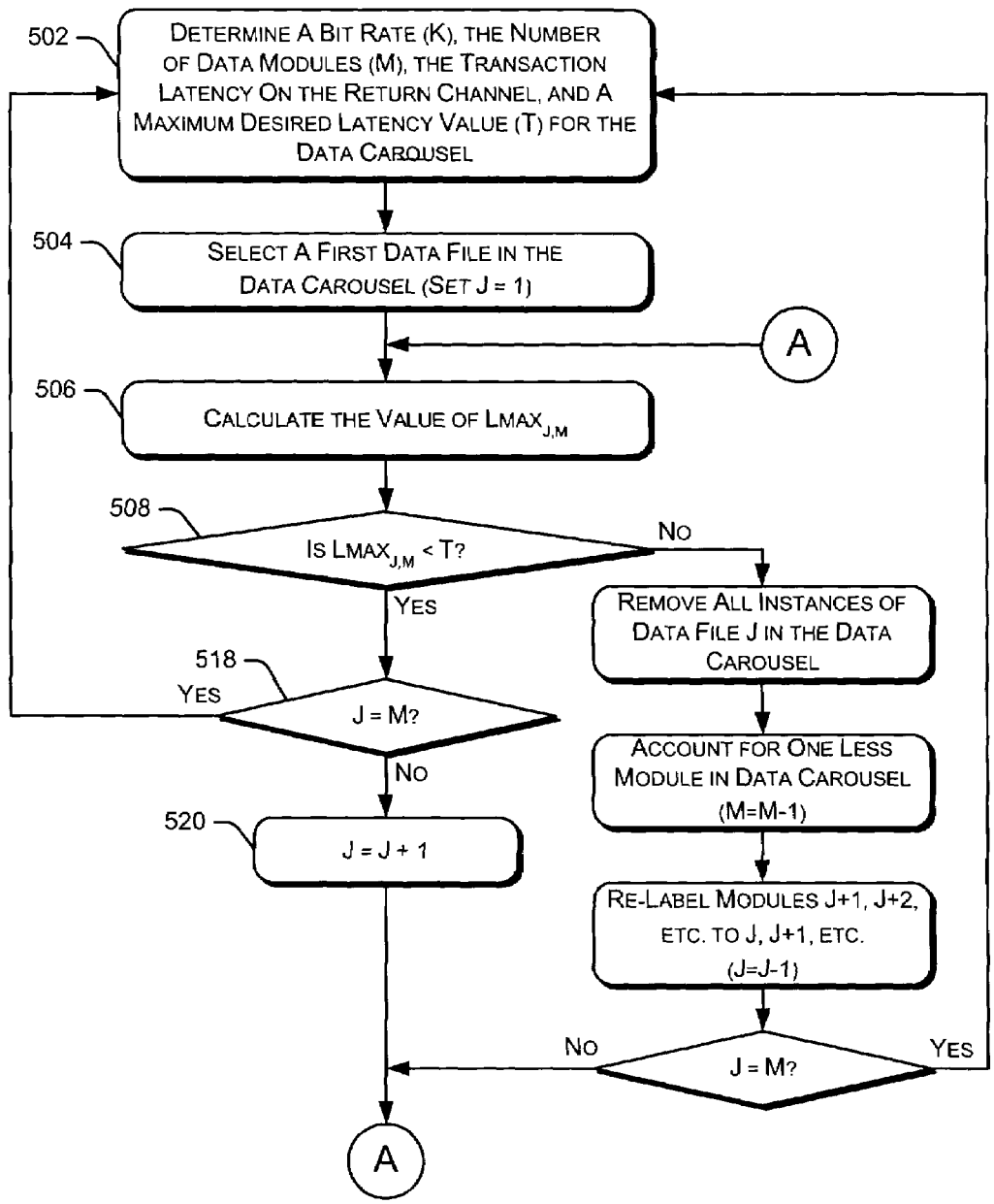
FIG. 5 is a flow diagram illustrating a procedure for managing a data carousel to maintain a minimum quality of service level.

FIG. 5 is a flow diagram illustrating a procedure 500 for managing a data carousel to maintain a minimum quality of service level. Initially, procedure 500 determines a bit rate (K), the number of data modules (M) in the data carousel, the transaction latency on the return channel, and a maximum desired latency value (T) for the data carousel (block 502). The maximum desired latency value is measured in seconds. The maximum desired latency value represents the maximum allowed time between subsequent transmissions of instances of the same data file within a single period of the data carousel. For example, a typical maximum desired latency value is on the order of 5-10 seconds. By enforcing the maximum desired latency value, the overall quality of service provided by the data carousel system is maintained at or above a particular level. Choices for the value of T may be affected by several considerations. In the case of receivers connected to a bi-directional communication channel, the value for T can be chosen such that the latency for retrieving any data file from the data carousel is less than the time it takes a user to retrieve a data file that is not in the data carousel.

Procedure 500 continues by selecting a first data file in the data carousel by setting a variable J equal to one (block 504). The procedure then calculates the latency value for data file J (block 506). Block 508 determines whether the latency value for data file J satisfies the criterion. If the criterion is not met, the procedure removes all instances of data file J from the data carousel (block 510). Procedure 500 then updates the number of modules in the data carousel to account for the removal of data file J (block 512). At block 514, the procedure re-labels the remaining modules to account for the fact that data file J has been removed from the data carousel. The procedure then determines whether all data files have been considered (block 516). If so, the procedure returns to block 502. Otherwise, the procedure returns to block 506 to continue evaluating the remaining data files.

If, in block 508, the latency value for data file J does satisfy the criterion, the procedure determines whether all data files have been considered (block 518). If so, the procedure returns to block 502. Otherwise, the procedure increments the value of J (block 520) and returns to block 506 to continue evaluating the remaining data files.

Thus, the procedure of FIG. 5 monitors and enforces the latency criterion. The procedure accounts for removed data files to calculate the remaining latencies. The latencies calculated before a data file removal from the data carousel are not recalculated. Removal of all instances of a data file from the data carousel will not worsen the latency, so the criterion will still be satisfied for these modules.

It should be noted that the procedure described in FIGS. 4A and 4B is complementary to the procedure described in FIG. 5. More specifically, the procedure shown in FIGS. 4A and 4B is suitable for dynamic management of a Data Carousel (addition of a new data module) while procedure described in FIG. 5 is suitable for off-line or initial configuration of a carousel.

In one embodiment, a carousel controller (e.g., carousel controller 202 in FIG. 2) or similar device reports the calculated worst case latency associated with each data module in the data carousel. The carousel controller also identifies each of these worst case latencies as either complying with or exceeding a reference latency threshold value.

Figure 6:
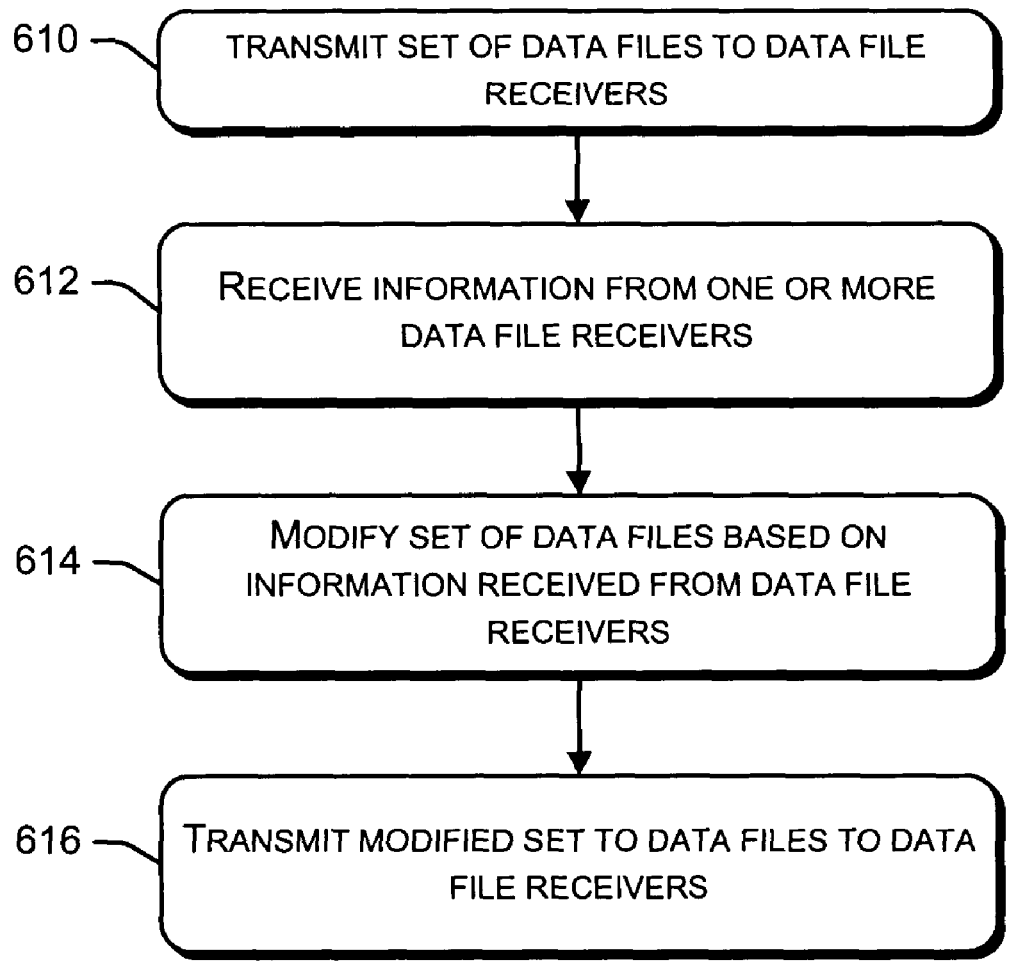
FIG. 6 illustrates various operations for modifying the arrangement of data files in a set of data files based on information from receivers of the set of data files.

Turning now to FIG. 6, illustrated are exemplary operations 600 for modifying the arrangement of data files in a set of data files (data carousel) based on information obtained from receivers of the set of data files. The operations 600 illustrated in FIG. 6 may be carried out separately or in combination with the operations described with respect to FIGS. 4 and 5.

As shown in FIG. 6, a first transmission operation 610 transmits (broadcasts) a set of data files to each of a plurality of data file receivers 212. The first transmission operation 610 transmits the set of data files in a predetermined order and in a cyclical manner. In accordance with one implementation, the data files are arranged as a data carousel, as described above with respect to FIG. 3. In accordance with one implementation, the first transmission operation 610 is carried out by a carousel generator, such as the carousel generator 206 shown and described with respect to FIG. 2. In accordance with other implementations, the first transmission operation 610 may be carried out in or by other mechanisms, systems, and/or processes.

As previously noted, the data files in the set of data files may include various types of information or data used for various purposes. For example, in accordance with one implementation, each of the data files in the set of data files is composed of or includes data for rendering an image on a video display. These data may have various formats. For example, and without limitation, in the case where the data files represent a series of linked, hierarchically arranged web pages, data files related to or representing various ones of the pages may be grouped into subsets or web page regions. The data files may include information for providing user selectable links between various ones of the images or data files. For example, the data files may include information for facilitating and displaying hypertext links. The data files may be composed of or include various other types of proprietary or non-proprietary code or data. For example, the data files may be composed of or include computer executable instructions (computer programs). In general, data files may contain any type of data used for any purpose.

In accordance with one implementation, the data files are grouped into subsets. That is, various data files in the set are associated with one another in some manner to form subsets of the set of data files. The manner in which the data files are grouped or associated may vary, depending on such things as the type of data in the files, the functional relationship of the data files to one another, the manner in which the files will be used by the data file receivers, the order in which the data files may be displayed by the data file receivers, and so on. For example, in the case where the data files comprise or include HTML code, the files may be grouped according to their relative positions, associations, or linkages in a web site that is represented by the data files, or their likely order of presentation on the data file receivers. In the case where the data files comprise or include computer executable instructions or program, the files may be grouped according to their functional relationship to one another, their type, or their likely order of execution on the data file receivers, and so on. In general, the data files in a set of data files may be grouped into subsets in any number of ways and by any of a number of different mechanisms or techniques.

For example, and without limitation, in the case where the data files represent a series of linked, hierarchically arranged pages, data files related to or representing various ones of the pages may be grouped into subsets. The data files in each subset may be selected as members of the subset based on their proximity in the hierarchy to one another. For example, data files representing a given branch or portion of a branch in the hierarchy may be associated together in a common subset. Alternatively, the data files may be associated in a set according to the level they occupy in the hierarchy. For example, all data files corresponding to a first or top level in the hierarchy may be members of a given subset, all data files corresponding to a second level in the hierarchy may be members of a given subset, and so on. Those skilled in the art will appreciate that there are numerous other ways that hierarchically arranged data may be categorized and/or associated.

In another example, and without limitation, in the case where each data files comprises or includes a computer executable program, the data files (programs) may be grouped according to subject matter. For example, if each data file is a computer executable game, they may be grouped according to arcade games, casino games, fantasy games, and so on. Those skilled in the art will appreciate that there are numerous other ways that computer executable programs may be categorized and/or associated.

Following the first transmission operation 610, a receiving operation 612 receives information from one or more of the data file receivers. In general, the information received in the receiving operation 612 may include any type of information in any form that may be sent by one or more data file receivers and used in modifying the arrangement of data files in the set of data files. Likewise, the manner in which the information is conveyed from the data file receivers may vary. In accordance with one embodiment, as previously described, the information is conveyed from the data file receivers via a back channel.

In accordance with one implementation, the received information is composed of or includes information related to individual data files; either previously sent to the data file receivers or a data file that is desired by the data file receiver. In accordance with another implementation, the received information is composed of or includes information related to one or more subsets of data files; either previously sent to the data file receivers or a data file that is desired by the data file receiver.

In accordance with one implementation, the receiving operation 612 is carried out in or by a carousel controller, such as the carousel controller 202 shown and described above with respect to FIG. 2. In accordance with other implementations, the receiving operation 612 may be carried out in or by other mechanisms, systems, and/or processes.

Next, a modify operation 614 modifies the set of data files transmitted during transmission operation 610 based on information received from one or more of the data file receivers. In general, a modification to the set of data files performed by the modify operation 614 may be any type of structural or functional alteration made to any one data file or subset of data files, or to the set of data files as a whole. For example, in accordance with one embodiment, modification of the set of data files includes adding and/or deleting a data file from the set of data files. In accordance with another embodiment, modification of the set of data files includes changing the order of data files in the set of data files. In accordance with another embodiment, modification of the set of data files includes changing a frequency of an existing data file in the set of data files. In accordance with another embodiment, modification of the set of data files includes changing the transmission rate of the set of data files. It should be appreciated that the modification of the set of data files in modification operation 614 may solely comprise or additionally include or implement any of the previously described processes described with respect to FIGS. 4 and 5.

In accordance with one implementation, the modify operation 614 is carried out by a carousel controller, such as the carousel controller 202 shown and described above with respect to FIG. 2. In accordance with other implementations, the modify operation 614 may be carried out in or by other mechanisms, systems, and/or processes.

Following the modify operation 614, a second transmission operation 616 transmits (broadcasts) the set of data files, as modified in modify operation 614, to each of a plurality of data file receivers 212. As with the first transmission operation 610, the second transmission operation 616 transmits the modified set of data files in a predetermined order and in a cyclical manner.

In accordance with one implementation, the second transmission operation 616 is carried out by a carousel generator, such as the carousel generator 206 shown and described with respect to FIG. 2. In accordance with other implementations, the second transmission operation 616 may be carried out in or by other mechanisms, systems, and/or processes.

Figure 7:
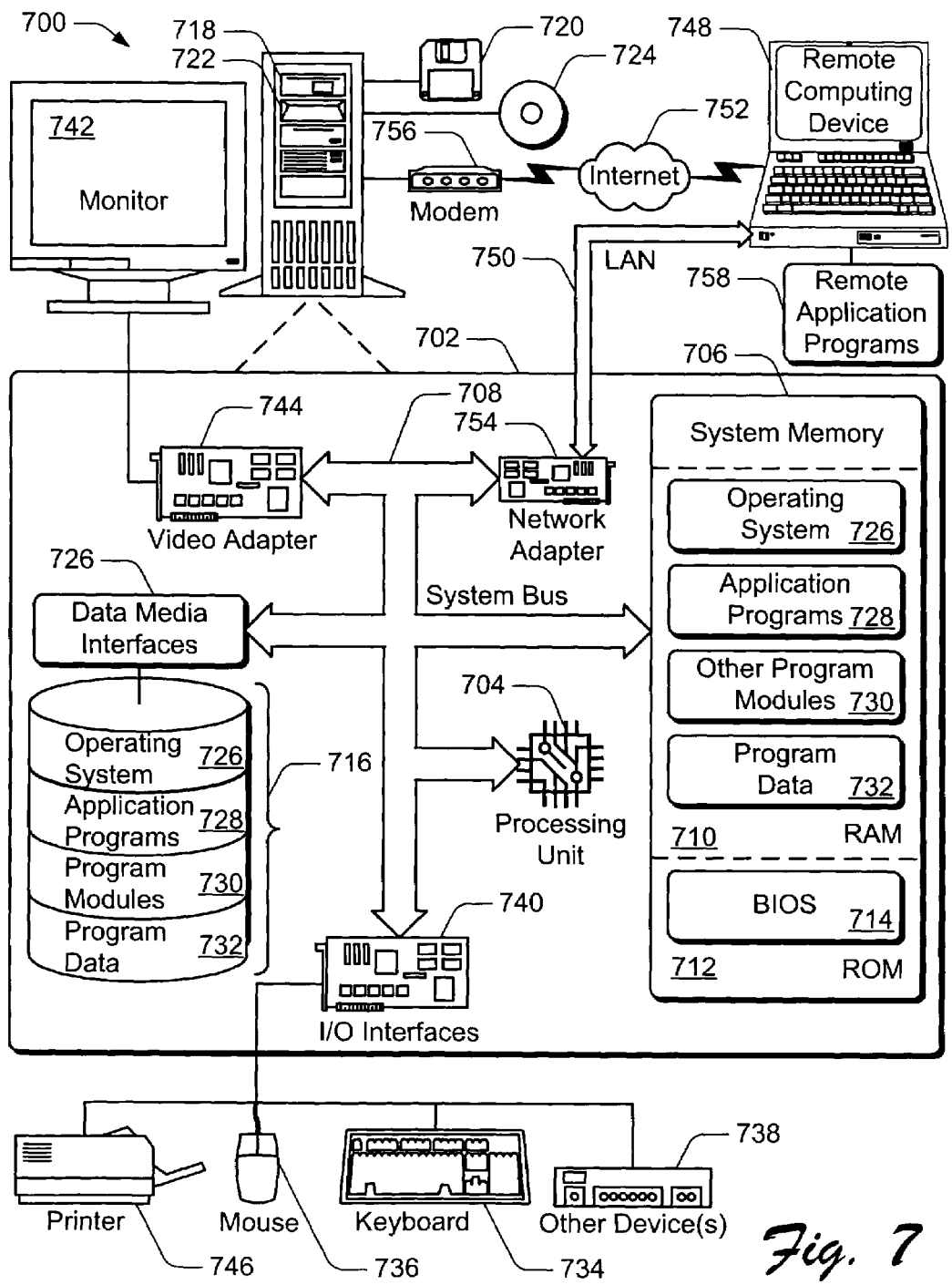
FIG. 7 illustrates an example of a computing environment.

FIG. 7 illustrates an example of a computing environment 700 within which the data carousel systems and methods, as well as the computer, network, and system architectures described herein, can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, by are not limited to, one or more processors 704 (e.g., any of microprocessors, controllers, and the like), a system memory 706, and a system bus 708 that couples various system components including the processor 704 to the system memory 706. The one or more processors 704 process various computer-executable instructions to control the operation of computing device 702 and to communicate with other electronic and computing devices.

The system bus 708 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 700 typically includes a variety of computer-readable media. Such media can be any available media that is accessible by computing device 702 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computing device 702, such as during start-up, is stored in ROM 712. RAM 710 typically contains data and/or program modules that are immediately accessible to and/or presently operated on by the processing unit 704.

Computing device 702 can also include other removable/non-removable, volatile/non-volatile computer storage media. By way of example, a hard disk drive 716 is included for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD, or any other type of optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer-readable instructions, data structures, program modules, and other data for computing device 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE- PROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of the systems and methods for a test instantiation system.

Computing device 702 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 702 via input devices such as a keyboard 734 and a pointing device 736 (e.g., a "mouse"). Other input devices 738 (not shown specifically) may include a microphone, joystick, game pad, controller, satellite dish, serial port, scanner, and/or the like. These and other input devices are connected to the processing unit 704 via input/output interfaces 740 that are coupled to the system bus 708, but may be connected by other interface and bus structures, such as a parallel port, game port, and/or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computing device 702 via the input/output interfaces 740.

Computing device 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computing device 702.

Logical connections between computing device 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computing device 702 is connected to a local network 750 via a network interface or adapter 754. When implemented in a WAN networking environment, the computing device 702 typically includes a modem 756 or other means for establishing communications over the wide network 752. The modem 756, which can be internal or external to computing device 702, can be connected to the system bus 708 via the input/output interfaces 740 or other appropriate mechanisms. It is to be appreciated that the illustrated network connections are exemplary and that other means of establishing communication link(s) between the computing devices 702 and 748 can be employed.

In a networked environment, such as that illustrated with computing environment 700, program modules depicted relative to the computing device 702, or portions thereof, may be stored in a remote memory storage device. By way of example, remote application programs 758 reside on a memory device of remote computing device 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
cyclically transmitting a set of data files to a plurality of data file receivers;
determining a number of data files accommodated by the set of data files;
determining a size of each data file;
determining a data transmission rate;
monitoring a worst case latency between successive transmissions of the data files in the set of data files, wherein the worst case latency is calculated by a summation, for other data files in the set of data files, of a relative ratio of the data file to another data file rounded up to a next integer times a file size of the data file, the summation divided by the data transmission rate;
modifying the set of data files based on information received from one or more of the plurality of data file receivers;
further modifying the set of data files if the worst case latency for the data files exceeds a threshold value, wherein the threshold value is the time it takes for a data file receiver request to reach a head end, the time it takes the head end to insert the data file into a cyclical transmission of data files and the time it takes for the data file receiver to acquire the data file; and
cyclically transmitting the modified set of data files to the plurality of data file receivers.

2. A method as recited in claim 1, wherein modifying the set of data files comprises at least one of adding one or more data files to the set of data files and removing one or more data files from the set of data files.

3. A method as recited in claim 1, wherein the set of data files comprises two or more data files arranged in a predetermined order and wherein modifying the set of data files comprises at least one of adding one or more data files to the set of data files, removing one or more data files from the set of data files, and changing the order of the data files in the set of data files.

4. A method as recited in claim 1, wherein modifying the set of data files comprises changing a frequency of an existing data file in the set of data files.

5. A method as recited in claim 1, wherein the data files are grouped into subsets and wherein the information received from the one or more of the plurality of data file receivers identifies one of the subsets.

6. A method as recited in claim 1, wherein each data file comprises data for rendering an image on a video display.

7. A method as recited in claim 1, wherein:
each data file comprises data for rendering an image on a video display;
the data files are grouped into subsets; and
the information received from the one or more of the plurality of data file receivers identifies one of the subsets.

8. A method as recited in claim 1, wherein:
each data file comprises data for rendering an image on a video display;
the data files are hierarchically associated; and
the information received from the one or more of the plurality of data file receivers identifies a position in the hierarchy.

9. A method as recited in claim 1, wherein:
each data file is associated with a computer executable program;
the data files are grouped into subsets; and
the information received from the one or more of the plurality of data file receivers identifies one of the subsets.

10. A method as recited in claim 1, wherein:
each data file comprises data for rendering an image on a video display;
each data file includes a user selectable link to another data file in the set of data files; and
the information received from the one or more of the plurality of data file receivers is associated with user selection of one or more of the links.

11. A method as recited in claim 1, wherein each data file comprises information associated with a web page.

12. A method as recited in claim 1, wherein each data file comprises a web page.

13. A method as recited in claim 1, wherein:
each data file comprises a web page; and
data files are grouped into subsets according to relative positions, associations, or linkages in a web site that is represented by the data files;
each web page includes one or more hypertext links;
the information received from the one or more of the plurality of data file receivers is associated with user selection of one or more of the hypertext links; and includes information related to one or more subsets of data files that is previously sent to the data file receivers or a data file that is desired by the data file receivers.

14. A method as recited in claim 1, wherein:
each data file comprises a web page;
each web page includes one or more hypertext links;
the web pages are grouped into web page regions; and
the information received from the one or more of the plurality of data file receivers identifies one or more a web page regions.

15. A method as recited in claim 1, wherein:
each data file comprises a web page;
each web page includes one or more hypertext links;
the web pages are grouped into web page regions; and
the information received from the one or more of the plurality of data file receivers identifies a web page region including a web page identified by a user selected hypertext link.

16. A method as recited in claim 1, further comprising:
determining a number of data files accommodated by the set of data files;
identifying a maximum latency value between successive transmissions of a particular data file in the set of data files;
identifying a request frequency associated with various data files; and
inserting data files into the set of data files based on the identified request frequency, the maximum latency value permitted between successive transmissions of a particular data file in the set of data files, and the information received from the one or more of the plurality of data file receivers.

17. A method as recited in claim 16, further comprising positioning the inserted data files such that a worst case latency between successive transmissions of a particular data file is less than the maximum latency value.

18. One or more computer-readable storage media containing a computer program that is executable by a processor to perform the method recited in claim 1.

19. One or more computer-readable storage media having stored thereon a computer program that, when executed by one or more processors, causes the one or more processors to:
determine an arrangement of data files in a set of cyclically broadcast data files based on information identifying a data file that is desired by a data file receiver, the information received from one or more data file receivers of the set of cyclically broadcast data files, such that a worst case latency between successive transmissions of a particular data file is less than a maximum latency value,
wherein the worst case latency is a summation, for all other data files in the set of data files, of the relative ratio of the particular data file to another data file rounded up to the next integer times a file size of the data file, the summation divided by a data transmission rate, and
wherein the maximum latency value is a maximum amount of time permitted between receiving a request for a particular file and providing the requested file from the data carousel.

* * * * *